United States Patent
Dayama et al.

(10) Patent No.: US 9,936,062 B2
(45) Date of Patent: Apr. 3, 2018

(54) INTELLIGENT MODE SELECTION BY CORRELATING DYNAMIC STATE OF A DEVICE WITH USERS SITUATIONAL CONTEXT

(71) Applicant: International Business Machines Corporation, Armonk, NY (US)

(72) Inventors: Pankaj S. Dayama, Bangalore (IN); Vijay Ekambaram, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/997,943

(22) Filed: Jan. 18, 2016

(65) Prior Publication Data

US 2017/0208167 A1   Jul. 20, 2017

(51) Int. Cl.
| H04M 3/42 | (2006.01) |
| H04M 1/725 | (2006.01) |
| H04W 68/00 | (2009.01) |
| H04W 4/02 | (2018.01) |

(52) U.S. Cl.
CPC ....... *H04M 1/72569* (2013.01); *H04W 4/021* (2013.01); *H04W 68/005* (2013.01); *H04M 1/72566* (2013.01); *H04M 1/72572* (2013.01)

(58) Field of Classification Search
CPC ......... H04M 1/72569; H04M 1/72566; H04M 1/72572; H04W 4/021; H04W 68/005
See application file for complete search history.

(56) References Cited

U.S. PATENT DOCUMENTS

| 7,248,835 | B2 | 7/2007 | Fan et al. | |
| 8,478,230 | B2 | 7/2013 | Zohar | |
| 8,499,037 | B2 | 7/2013 | Ramnani | |
| 9,088,882 | B2 | 7/2015 | Ferren | |
| 2004/0259536 | A1* | 12/2004 | Keskar | H04M 1/72569 455/418 |
| 2006/0025159 | A1 | 2/2006 | Estevez et al. | |
| 2006/0116175 | A1* | 6/2006 | Chu | H04M 1/72569 455/567 |
| 2009/0298511 | A1* | 12/2009 | Paulson | H04M 1/72572 455/456.1 |

(Continued)

FOREIGN PATENT DOCUMENTS

WO    WO2013180892 A1    12/2013

*Primary Examiner* — Barry Taylor
(74) *Attorney, Agent, or Firm* — Ference & Associates LLC (57) ABSTRACT

One embodiment provides a method for responding to an incoming communication based upon a dynamic state and a situational context related to a device of a user, the method including receiving an incoming communication at a mobile communication device; identifying at least one user-determined control level based upon an incoming communication, wherein the user-determined control level is based upon a physical orientation and a situational context of the mobile communication device; selecting a preferred mode of the user-determined control level based upon the incoming communication; and implementing at the mobile communication device, in response to the incoming communication, the preferred mode of the user-determined control level stored in the mobile communication device. Other variants and embodiments are broadly contemplated herein.

15 Claims, 3 Drawing Sheets

(56) References Cited

U.S. PATENT DOCUMENTS

| | | | |
|---|---|---|---|
| 2010/0048256 A1* | 2/2010 | Huppi | H04M 1/72563 |
| | | | 455/574 |
| 2010/0304719 A1 | 12/2010 | Deep | |
| 2010/0317371 A1* | 12/2010 | Westerinen | H04M 1/72566 |
| | | | 455/456.6 |
| 2012/0115501 A1* | 5/2012 | Zheng | H04M 1/72569 |
| | | | 455/456.1 |
| 2013/0226850 A1* | 8/2013 | Hannuksela | G10L 25/48 |
| | | | 706/14 |
| 2013/0316744 A1* | 11/2013 | Newham | H04M 19/04 |
| | | | 455/458 |
| 2014/0067371 A1 | 3/2014 | Liensberger | |
| 2015/0317892 A1* | 11/2015 | Raj | G08B 21/18 |
| | | | 340/6.1 |
| 2016/0205267 A1* | 7/2016 | Vaughn | H04M 19/04 |
| | | | 455/566 |

* cited by examiner

INTELLIGENT MODE SELECTION BY CORRELATING DYNAMIC STATE OF A DEVICE WITH USERS SITUATIONAL CONTEXT

BACKGROUND

Mobile device users increasingly use a device that is fully autonomous and intelligent, capable of independently handling various scenarios during their day to day activities. Due to this trend, users value the ability to respond to important incoming messages by using a device capable of adapting to their contextual situation as well as their location. The working style of most people requires a device that would exhibit cognitive capabilities correlating to the dynamic state relating to a contextual situation of the user. The reactivity of a mobile device can be indicative of a user's natural behavior, and the type of engagement or working style inherent to an individual which can then be exhibited during a response to incoming messages. This intelligent type of device can greatly enhance a user's management of all incoming messages and generate a response consistent with any contextual situation.

BRIEF SUMMARY

In summary, one aspect of the invention provides a method for responding to an incoming communication based upon a dynamic state and a situational context related to a device of a user, said method comprising: utilizing at least one processor to execute computer code that performs the steps of: receiving an incoming communication at a mobile communication device; identifying at least one user-determined control level based upon an incoming communication, wherein the user-determined control level is based upon a physical orientation and a situational context of the mobile communication device; selecting a preferred mode of the user-determined control level based upon the incoming communication; and implementing at the mobile communication device, in response to the incoming communication, the preferred mode of the user-determined control level stored in the mobile communication device.

Another aspect of the invention provides an apparatus for responding to an incoming communication based upon a dynamic state and a situational context related to a device of a user, said apparatus comprising: at least one processor; and a computer readable storage medium having computer readable program code embodied therewith and executable by the at least one processor, the computer readable program code comprising: computer readable program code configured to receive an incoming communication at a mobile communication device; computer readable program code configured to identify at least one user-determined control level to an incoming communication, wherein the user-determined control level to the incoming communication based upon incoming communication is based upon a physical orientation and a situational context of the mobile communication device; computer readable program code configured to select a preferred mode of the user-determined control level based upon the incoming communication; and computer readable program code configured to implement at the mobile communication device, in response to the incoming communication, the preferred mode of the user-determined control level stored in the mobile communication device.

An additional aspect provides a computer program product for responding to an incoming communication based upon a dynamic state and a situational context related to a device of a user, said computer program product comprising: at least one processor; and a computer readable storage medium having computer readable program code embodied therewith and executable by the at least one processor, the computer readable program code comprising: computer readable program code configured to receive an incoming communication at a mobile communication device; computer readable program code configured to identify at least one user-determined control level based upon an incoming communication, wherein the user-determined control level is based upon a physical orientation and a situational context of the mobile communication device; computer readable program code configured to select a preferred mode of the user-determined control level based upon the incoming communication; and computer readable program code configured to implement at the mobile communication device, in response to the incoming communication, the preferred mode of the user-determined control level stored in the mobile communication device.

A further aspect of the invention provides a method comprising: receiving an incoming communication at a mobile communication device of the user; determining a user-assigned ordinal position of the incoming communication; determining a physical orientation specific to at least one location of the mobile communication device; an altering a characteristic of the mobile communication device based upon the physical orientation of mobile communication device.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made here below to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an exemplary embodiment, most if not all of the process steps, components and outputs discussed with respect to FIGS. 1 and 2 can be performed or utilized by way of a processing unit or units and system memory such as those indicated, respectively, at 16' and 28' in FIG. 3, whether on a server computer, a client computer, a node computer in a distributed network, or any combination thereof.

Broadly contemplated herein, in accordance with at least one embodiment of the invention, are methods and arrangements which provide intelligent automatic selection systems for mobile communication devices. The detection of an individual's mobile device such as whether the device is in a pocket, being held by a user, inside a backpack, on a table, etc., is determined by using a combination of sensors such as light sensors, accelerometers, cameras, gyroscope or microphone. A set of sophisticated inference models (such as GMM—Gaussian mixture model or SVM—support vector machine) on different sensor data and a temporal smoothing using HMM (hidden Markov Model) can lead to an accuracy of approximately 85% for detecting the position modalities (a way or mode of selection in which the response has been pre-determined) of a mobile device.

For ease of understanding, an example method of ordinal classification will be used. However, as can be understood by one skilled in the art, the use of embodiments as described herein can be used in other applications and systems. For example, an application determining the ordinal classification is based on a user response model based on past behavior, specific user preference and a level of control desired by the user for response messages. This also provides a manner in which to gather historical data on a user profile, caller profile, context information such as time of day, location, other participants, proximity input, etc. In other words, this application is a model for recommending appropriate mode selections based on historical behavior, present contextual information, and dynamic information.

The modes of a mobile communication device are considered to have an ordinal relationship (e.g., 1. switch-off mode<2. airplane mode<3. silent mode<4. vibrate mode<5. ring mode<6. outdoor mode). A misclassification cost may include the misclassification of the ordinal classification and the response time based on the physical position of the mobile device. The misclassification cost may be selected based on the level of control selected by the device user. For example, the level of control selected by the device user may range from conservative, where the user may not provide as much oversight, to aggressive where the user provides a large amount of oversight. As an example, the misclassification parameter may range from 0 (silent) to 50 (outdoor) in the conservative level of control as opposed to 0 (silent) to 1.0 (outdoor) in the aggressive level of control. This application can be used for training of the device for appropriate mode selection responses and would ensure that a user would not miss important incoming messages or disturb others during activities such as, but not limited to, meetings, sleep, or social events.

In accordance with at least one embodiment of the invention, there are broadly contemplated herein methods and arrangements, inter alia, for assessing an importance score computation between the sender of an incoming message and the user's device based on the dynamic state of the user and information accumulated from past messages exchanged by the user with the sender. Adaptability to and proficiency in new responses are evaluated by using an authentication code which in turn will score a value of 1.0 to the modes according to predefined mapping. A criticality-based score can also be assigned based on parsing of the incoming or outgoing text messages as well as caller information. The criticality can be evaluated to determine consequences of the response and assist in providing appropriate scoring being assigned to the mobile modes. An importance score for a mode is equal to the Max score determined by the code based score and the criticality based score. Dependability indices can also be applied to determine how well the response messages are formulated and sent. Information can be collected from various sources of input and assigned an importance value along with pre-selected contextual modes of the user. In other words, each response will consist of ordinal assignments as well as physical and contextual information. The system monitors the activities of a user and determines an appropriate response. The end result provides successful management of the user's mobile communication device. Solutions toward this end, and others, will now be appreciated from the ensuing discussion. The features discussed above, and others, relating to at least one embodiment of the invention, will be better appreciated from the discussion which follows.

Figure 1:
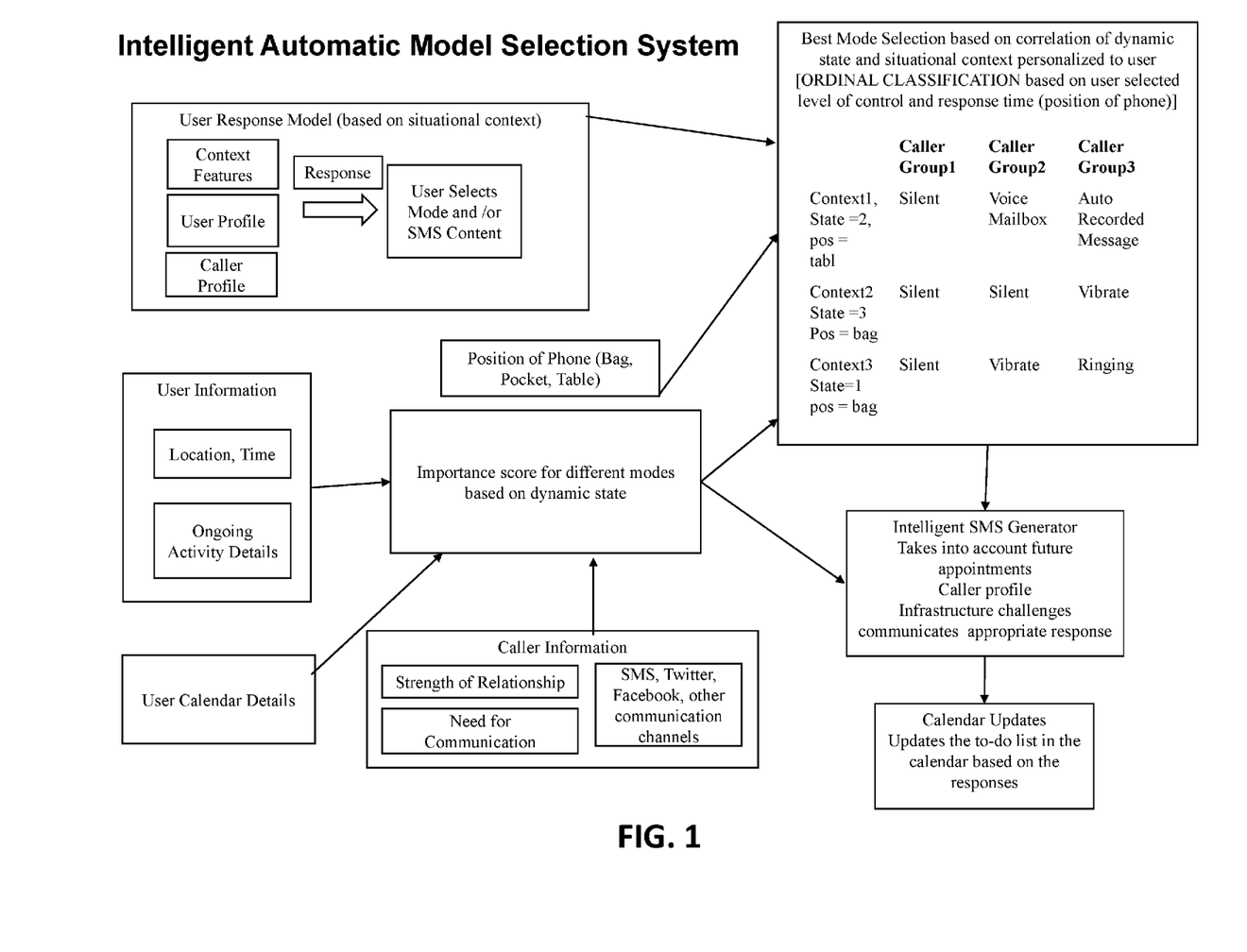
FIG. 1 schematically illustrates a system architecture of an intelligent automatic model selection system for mobile communication devices.

In accordance with a general background relative to at least one embodiment of the invention, FIG. 1 schematically illustrates a general concept of determining intelligent automatic model selection for mobile communication devices based on correlating a dynamic state derived from incoming messages and contextual situational information of a user. Here, in a working scenario, an individual user response model can be assessed by determining a situational context relating to context features, user, and caller profiles. The response of the user can be made in view of mode and content. The position of the mobile device can also be determined as well as an importance score for different modes based on the dynamic state of the user such as, but not limited to, location, time of day, ongoing activity details, along with calendar details. An importance score can be assigned for different modes based on the determined dynamic state associated with the user. The incoming information is also assessed based on the strength of the relationship of the sender to the receiver (user), a need for specific communication, and social media considerations. An ordinal classification can then be personalized to the user based on the determined dynamic and contextual situational context. The ordinal classification is also based on user control level, along with user response time determined by the physical position of the mobile communication device where the user provided configurable level of control is continuous on the scale of 0 to 1; 0 is equal to no control by the user and 1 is equal to full control of input for response set by the user. Determination of an intelligent SMS (short message service) generator takes in to account, but is not limited to, future calendar appointments, caller profile, infrastructure challenges, and communicates the appropriate response. Calendar updates will then be made based on the responses generated.

Each generated message profile will contain information regarding the caller profile, existing commitments, as well as historical interactions. These steps of transformation are based on the level of formalism required that have been pre-determined by historical interactions and time availability, and infrastructure availability. Appropriate responses can then be determined and calendars can be updated based on the message sent and finally, a priority list, based on ordinal classification will be set.

As such, there are broadly contemplated herein, in accordance with at least one embodiment of the invention, methods and arrangements for responding to a device of a user. At a very general level, FIG. 2 provides an overview of the main steps in a procedure broadly contemplated herein, with reference made to a user related profile mode at a mobile communication device in responding to incoming communication.

It can be appreciated from the foregoing that, in accordance with at least one embodiment of the invention, a technical improvement is disclosed for responding to an incoming communication based on a pre-determined ordinal position of a specific response to the incoming communication as related to a device of a user. This can involve an effective method of modeling the mode selection as an ordinal classification in which the objective is based on the user's desired level of control and response time which is computed based on the position of the mobile communication device as it relates to the user. An important function is the fine tuning mode selection output that has been derived from the ordinal classification model and then taking appropriate actions.

In accordance with at least one embodiment of the invention, very generally, quantitative values as determined herein, or other data or information as used or created herein, can be stored in memory or displayed to a user on a screen, as might fit the needs of one or more users.

Figure 2:
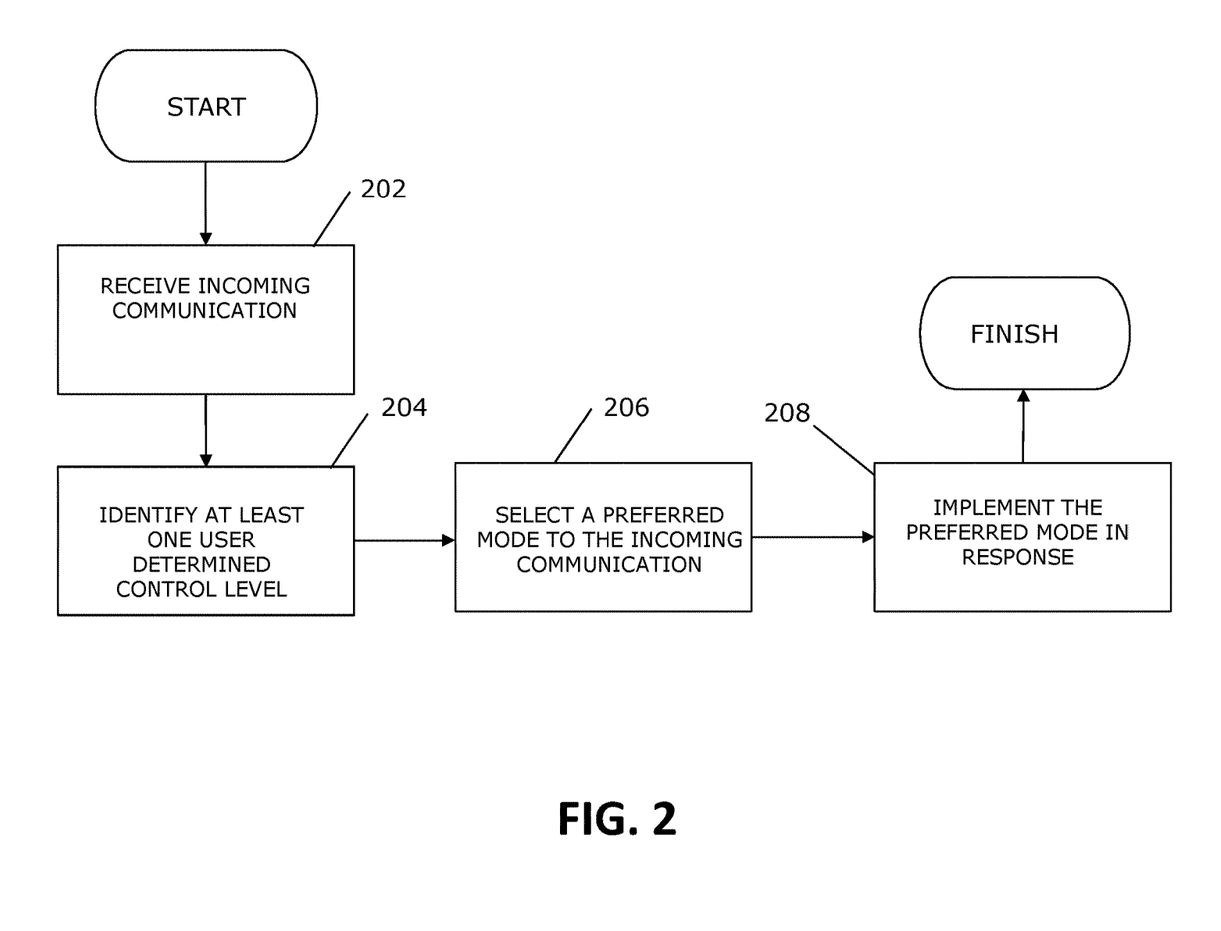
FIG. 2 sets forth a process more generally for responding to an incoming communication based upon an ordinal position related to the device of a user.
Figure 3:
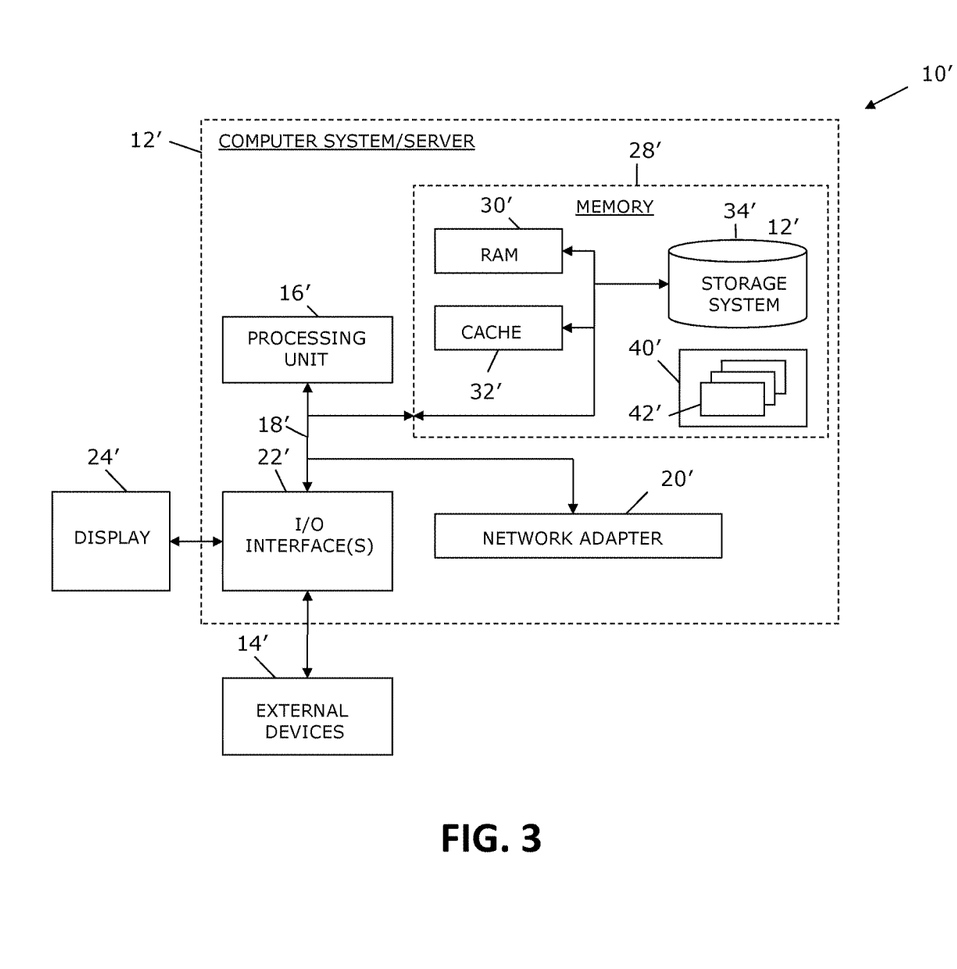
FIG. 3 illustrates a computer system.

It should be appreciated that a process, such as that broadly illustrated in FIG. 2, can be carried out on essentially any suitable computer system or set of computer systems, which may, by way of an illustrative and non-restrictive example, include a system such as that indicated at 12' in FIG. 3. In accordance with an example embodiment, most if not all of the process steps discussed with respect to FIG. 2 can be performed by way of a processing unit or units and system memory such as those indicated, respectively, at 16' and 28' in FIG. 3.

As shown in FIG. 2, in accordance with at least one embodiment of the invention, an incoming communication is received (202). At least one user-determined control level is identified (204). There is selected a preferred mode to the incoming communication (206). The preferred mode is then applied to the incoming communication at the mobile communication device (208).

Referring now to FIG. 3, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of responding to an incoming communication based upon a dynamic state and a situational context related to a device of a user, said method comprising:
   utilizing at least one processor to execute computer code that performs the steps of:
   receiving an incoming communication at a mobile communication device;
   identifying at least one user determined control level based upon an incoming communication, wherein the user determined control level is based upon detecting a physical orientation and a situational context of the mobile communication device and wherein the identifying comprises utilizing a cost function, wherein the cost function is determined by: historical data correlated between a user and a sender related to the mobile communication device, user determined control level, and user contextual situation;
   selecting a preferred mode of the user determined control level based upon the incoming communication; and
   applying, in response to the incoming communication, the preferred mode of the user determined control level stored in the mobile communication device, wherein the preferred mode comprises providing a response to the incoming communication based on the physical orientation and the situational context;
   wherein the user determined control level comprises a preferred preprogrammed mode for the mobile communication device;
   wherein the preferred preprogrammed mode comprises a criticality based score determination derived from a historical and dynamic state of the mobile communication device.

2. The method according to claim 1, wherein the detecting a physical orientation comprises determining via at least one sensor of the mobile communication device, the physical orientation of the mobile communication device.

3. The method according to claim 1, wherein the selecting comprises identifying, based upon the physical orientation of the mobile communication device, a location of the mobile communication device.

4. The method according to claim 1, wherein the physical orientation is specific to at least one location of the mobile communication device in relation to the user.

5. The method according to claim 1, comprising parsing the incoming communication received by the mobile communication device.

6. The method according to claim 1, wherein the identifying comprises:
   inferring a dynamic state of the mobile communication device; and
   estimating a response to the incoming communication based on the user determined control level mode of the mobile communication device.

7. The method according to claim 1, wherein the situational context comprises information related to a situation of the user and information related to a relationship of the user to a sender of the incoming communication.

8. An apparatus for responding to an incoming communication based upon a dynamic state and a situational context related to a device of a user, said apparatus comprising:
   at least one processor; and
   a computer readable storage medium having computer readable program code embodied therewith and executable by the at least one processor, the computer readable program code comprising:

computer readable program code configured to receive an incoming communication at a mobile communication device;

computer readable program code configured to identify at least one user determined control level to an incoming communication, wherein the user determined control level based upon incoming communication is based upon detecting a physical orientation and a situational context of the mobile communication device and wherein the identifying comprises utilizing a cost function, wherein the cost function is determined by: historical data correlated between a user and a sender related to the mobile communication device, user determined control level, and user contextual situation;

computer readable program code configured to select a preferred mode of the user determined control level based upon the incoming communication; and computer readable program code configured to apply, in response to the incoming communication, the preferred mode of the user determined control level stored in the mobile communication device, wherein the preferred mode comprises providing a response to the incoming communication based on the physical orientation and the situational context;

wherein the user determined control level comprises a preferred preprogrammed mode for the mobile communication device;

wherein the preferred preprogrammed mode comprises a criticality based score determination derived from a historical and dynamic state of the mobile communication device.

9. A computer program product for responding to an incoming communication based upon a dynamic state and a situational context related to a device of a user, said computer program product comprising:

at least one processor; and a computer readable storage medium having computer readable program code embodied therewith and executable by the at least one processor, the computer readable program code comprising:

computer readable program code configured to receive an incoming communication at a mobile communication device and wherein the identifying comprises utilizing a cost function, wherein the cost function is determined by: historical data correlated between a user and a sender related to the mobile communication device, user determined control level, and user contextual situation;

computer readable program code configured to select a preferred mode of the user determined control level based upon the incoming communication; and computer readable program code configured to apply, in response to the incoming communication, the preferred mode of the user determined control level stored in the mobile communication device, wherein the preferred mode comprises providing a response to the incoming communication based on the physical orientation and the situational context;

wherein the user determined control level comprises a preferred preprogrammed mode for the mobile communication device;

wherein the preferred preprogrammed mode comprises a criticality based score determination derived from a historical and dynamic state of the mobile communication device.

10. The computer program product according to claim 9, wherein the selecting comprises determining via at least one sensor of the mobile communication device, the physical orientation of the mobile communication device.

11. The computer program product according to claim 9, wherein the selecting comprises identifying, based upon the physical orientation of the mobile communication device, a location of the mobile communication device.

12. The computer program product according to claim 9, wherein the physical orientation is specific to at least one location of the mobile communication device in relation to the user.

13. The computer program product according to claim 9, comprises parsing the incoming communication received by the communication device.

14. The computer program product according to claim 9, wherein the identifying comprises:

inferring a dynamic state of the mobile communication device; and estimating a response to the incoming communication based on the user profile mode of the mobile communication device.

15. A method comprising:

responding to an incoming communication based upon a user assigned ordinal position related to a device of the user;

receiving an incoming communication at a mobile communication device;

detecting the physical orientation specific to at least one location of the mobile communication device in relation to the user;

utilizing a cost function, wherein the cost function is determined by a preprogrammed mode of the mobile communication device, user control level, and user contextual situation, wherein the preprogrammed mode comprises a critically based score determination derived from a historical and dynamic state of the mobile communication device; and providing a response to the incoming communication based on the cost function.

* * * * *